US012084817B2

(12) United States Patent
Shoup

(10) Patent No.: US 12,084,817 B2
(45) Date of Patent: Sep. 10, 2024

(54) COCONUT HARD SHELL GRANULAR INFILL FOR SYNTHETIC SPORT FIELDS

(71) Applicant: GENUS INDUSTRIES, LLC, Oregon City, OR (US)

(72) Inventor: David E. Shoup, Oregon City, OR (US)

(73) Assignee: Genus Industries, Inc., Oregon City, OR (US)

( * ) Notice: Subject to any disclaimer, the term of this patent is extended or adjusted under 35 U.S.C. 154(b) by 385 days.

(21) Appl. No.: 17/287,075

(22) PCT Filed: Nov. 11, 2019

(86) PCT No.: PCT/US2019/060760

§ 371 (c)(1),
(2) Date: Apr. 20, 2021

(87) PCT Pub. No.: WO2020/102091

PCT Pub. Date: May 22, 2020

(65) Prior Publication Data

US 2021/0355641 A1 Nov. 18, 2021

Related U.S. Application Data

(60) Provisional application No. 62/767,567, filed on Nov. 15, 2018.

(51) Int. Cl.
*B02C 19/00* (2006.01)
*B02C 23/08* (2006.01)
(Continued)

(52) U.S. Cl.
CPC .......... *E01C 13/08* (2013.01); *B02C 19/0056* (2013.01); *B02C 23/08* (2013.01);
(Continued)

(58) Field of Classification Search
CPC ..... E01C 13/08; B02C 19/0056; B02C 23/38; B02C 23/14
See application file for complete search history.

(56) References Cited

U.S. PATENT DOCUMENTS 6,818,274 B1 11/2004 Buck et al.
2002/0048676 A1 4/2002 McDaniel et al.
(Continued)

FOREIGN PATENT DOCUMENTS

CA 2670189 A1 * 7/2010 .......... B29B 7/7461
CN 106579475 A * 4/2017
(Continued)

OTHER PUBLICATIONS

"Guidelines for Crumb Rubber Infill Used in Synthetic Turf Fields," www.SyntheticTurfCouncil.org, Oct. 2010.
(Continued)

*Primary Examiner* — Faye Francis
(74) *Attorney, Agent, or Firm* — Miller Nash LLP

(57) ABSTRACT

Coconut crumb can serve as an infill material on synthetic turf fields in the place of tire crumb. The crumbs are less than 10 mm big and have smooth corners and edges. The process of producing the coconut crumb involves successive grinding or milling processes that reduce the inner hard shell of the coconut to particles of an appropriate size for infill, while screening out the unwanted material from being included in the infill.

9 Claims, 9 Drawing Sheets

(51) Int. Cl.

| | |
|---|---|
| ***B02C 23/14*** | (2006.01) |
| ***B02C 23/38*** | (2006.01) |
| ***D06N 7/00*** | (2006.01) |
| ***E01C 13/08*** | (2006.01) |
| *D01B 1/00* | (2006.01) |

(52) U.S. Cl.

CPC .............. *B02C 23/14* (2013.01); *B02C 23/38* (2013.01); *D06N 7/0063* (2013.01); *D01B 1/00* (2013.01); *D06N 2205/106* (2013.01); *D06N 2211/16* (2013.01)

(56) References Cited

U.S. PATENT DOCUMENTS

| | | | | |
|---|---|---|---|---|
| 2008/0299331 | A1 | 12/2008 | Gilardi | |
| 2009/0113791 | A1 * | 5/2009 | Bertin ..................... | C05F 11/00 47/9 |
| 2010/0055461 | A1 | 3/2010 | Daluise et al. | |
| 2010/0166984 | A1 | 7/2010 | Nusca | |
| 2018/0016498 | A1 * | 1/2018 | Shoup ...................... | C05G 3/80 |
| 2019/0203425 | A1 | 7/2019 | Sawyer et al. | |

FOREIGN PATENT DOCUMENTS

| | | | |
|---|---|---|---|
| CN | 209501834 | U * | 10/2019 |
| EP | 1900874 | A2 | 3/2008 |
| EP | 2 206 833 | | 7/2010 |
| EP | 3636837 | A1 | 4/2020 |
| WO | 2007010324 | A1 | 1/2007 |
| WO | 2008115085 | | 9/2008 |
| WO | 2008125895 | A1 | 10/2008 |
| WO | 2019133789 | | 7/2019 |

OTHER PUBLICATIONS

"Guidelines for Synthetic Turf Performance," www.SyntheticTurfCouncil.org, Dec. 2011.

"Federal Research on Recycled Tire Crumb Used on Playing Fields," www.epa.gov/chemical-research/federal-research-recycled-tire-crumb-used-playing-fields, last updated May 10, 2021.

International Search Report and Written Opinion, PCT/US2019/060760, dated Jan. 30, 2020, 9 pages.

* cited by examiner

COCONUT HARD SHELL GRANULAR INFILL FOR SYNTHETIC SPORT FIELDS

CROSS-REFERENCE TO RELATED APPLICATIONS

This application is a § 371 of PCT/US2019/060760, filed Nov. 11, 2019, which claims priority to and the benefit of U.S. Provisional No. 62/767,567 filed Nov. 15, 2018, both of which are incorporated herein by reference in their entirety.

BACKGROUND

Synthetic sports fields typically have synthetic turf fibers on top of an infill material. The infill material allows the field to have a slight grade to it from the center of the field to the sides to allow for better drainage, and helps protect the players by providing shock absorption, traction, and foot stability. Currently, most infill material consists of rubber crumbs, which mostly come from recycled tires.

There are several disadvantages to the rubber crumb. It is not very environmentally friendly, being made out of recycled tires. While being able to use the tires for the crumb is better than the tires filling up landfills, the crumbs themselves are not biodegradable either. In addition, there has been some data indicating that they are carcinogenic.

DETAILED DESCRIPTION OF THE EMBODIMENTS

The use of infill in synthetic turf fields is governed by the Synthetic Turf Council (www.SyntheticTurfCouncil.org), which has produced several documents including "Guidelines for Synthetic Turf Performance," published in December, 2011, and "Guidelines for Crumb Rubber Infill Used in Synthetic Turf Fields," which were approved in October of 2010. Any material replacing the crumb rubber infill will need to meet the same or similar requirements. One issue that arises is that even if the material is intended as infill, it ends up on top of the turf and will come into contact with the people on the field. It is also somewhat intrusive ending up in shoes, equipment bags, inside players' clothes, etc. High levels of contact between the crumb and the users will occur.

While the use of recycled tires as the infill material has some advantages, concerns have been raised about the health effects of tire crumb. Tire crumb is not just used as infill for sporting fields, but is also used as cushioning material in playgrounds. The EPA began a study in 2016 about the health concerns of tire crumbs (www.epa.gov/tirecrumb).

Coconut hard shell material can meet the above standards without the health concerns, being an all-natural substance. Coconut shell has high lignin and cellulose content, and the casing contains materials that resistant to bacteria and fungi. Other uses of coconut shell exists, including in the manufacture of mosquito coils, incense sticks, in plywood manufacturing as a phenolic extruder, and as filler in the manufacture of resin glue.

As used here the term "coconut crumb" means one or more particles of the hard inner shell of a coconut cut down to particles typically having a size in the range from 4-7 millimeters, inclusive, but may include any crumbs of smaller than 10 mm. The term "coconut chips" means one or more particles of the hard inner shell of a coconut cut down to particles having a size in the range from 20 to 40 mm, inclusive, by may include any crumbs larger than 20 mm. These ranges are estimates but are intended to differentiate between particles that are 20 mm or larger, which are called chips, and particles that are 7 mm or smaller, call crumb. The term "coconut crumb infill" and "coconut crumb" are intended to be interchangeable.

Figure 1:
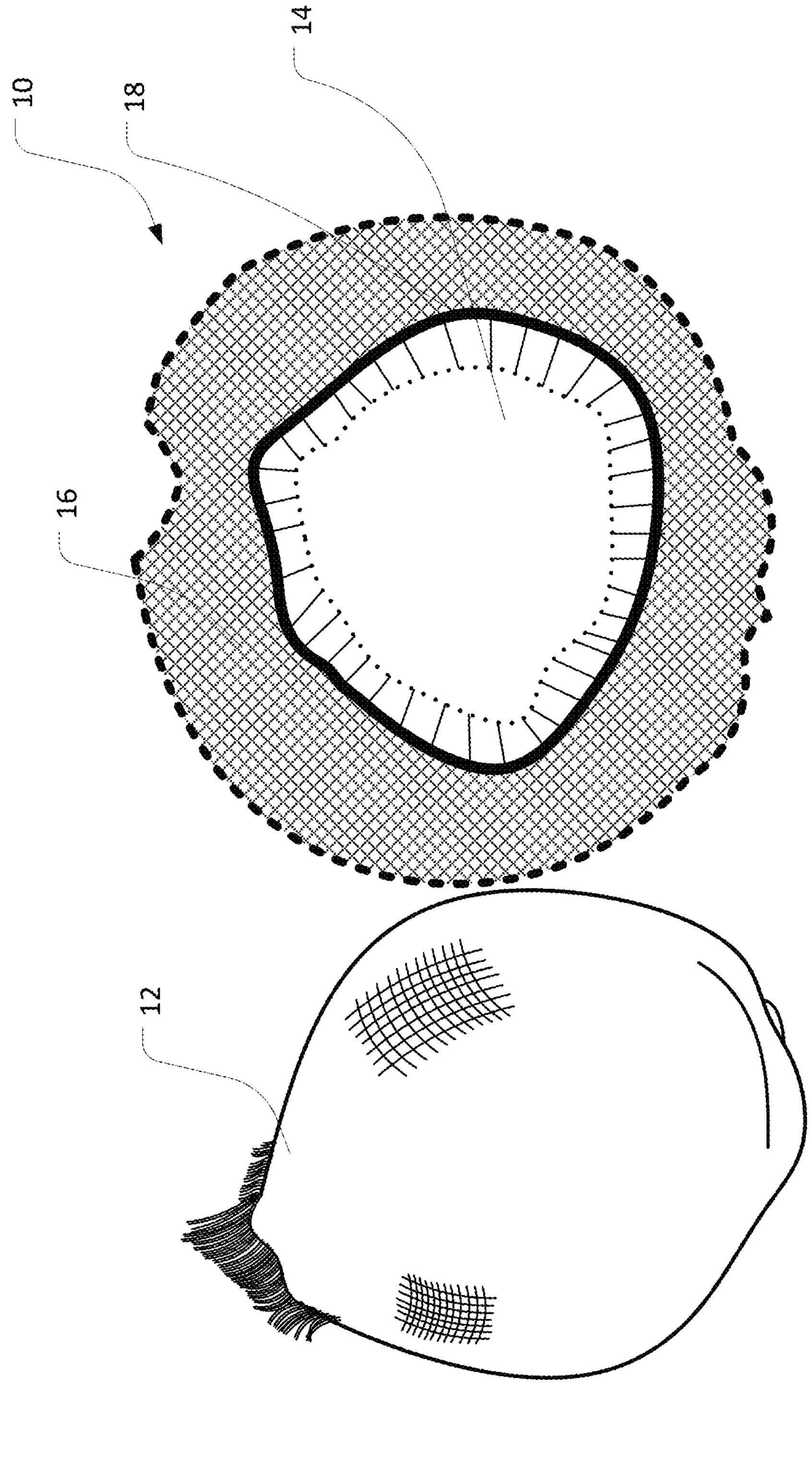
FIG. 1 shows the parts of a coconut and the hard shell used for crumb infill.

FIG. 1 shows a coconut 10 split open, with its husk 12 next to it. The hard inner shell is what is of interest here, but it helps to clarify by looking at the other portions of the coconut. The white innermost material 14 is typically referred to as its 'meat' 'copra' and contains coconut water. The layer of spongy material 16 between the meat and the outer shell is referred to as 'pith' with 'coir' and 'fiber'. Pith is highly absorbent and has uses with shell infill materials that may be appropriate here, as an infill amendment to the coconut shell infill. The hard inner shell 18 is what is also of interest here.

Figure 2:
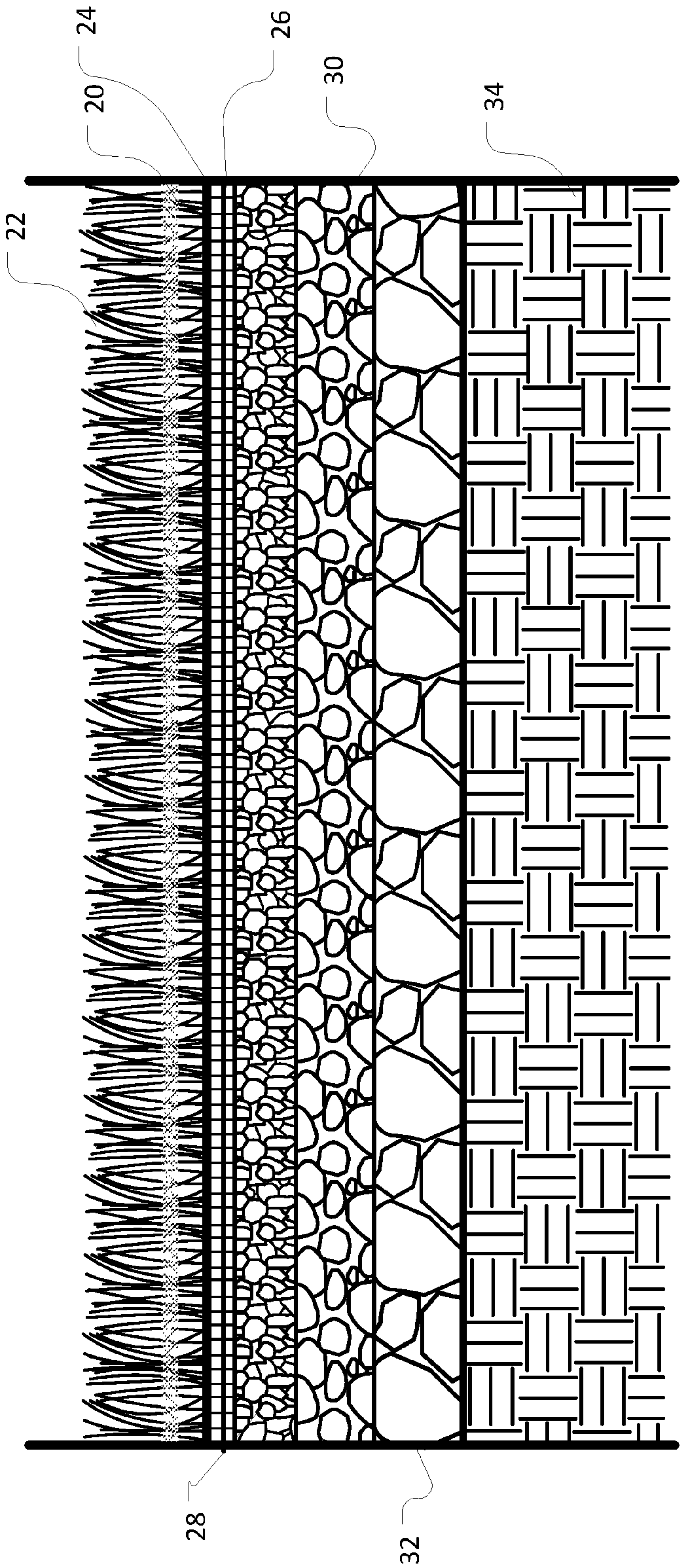
FIG. 2 shows a diagram of an embodiment of synthetic turf with coconut crumb infill material.

FIG. 2 shows a view of a synthetic turf field using coconut crumb infill instead of tire crumb infill. As can be seen in the diagram, the infill 20 is the second layer from the top and has a grade such that the finished field has a slope from the center of the field to the sidelines to allow for drainage. The synthetic turf lies 22 on top of the coconut crumb infill. Underneath the coconut infill, there may be many layers. In this example, there are layers of a thick, resilient shock and drainage pan 24, a geotextile fabric 26, a compacted aggregate leveling course 28, a compacted aggregate base course 30, a layer of subbase material 32, and the compacted subgrade material 34. The selection and configuration of these materials is left up to the system designer, but in general the coconut crumb and replace the tire crumb as infill with no modifications of the underlying layers of the field.

Figure 3:
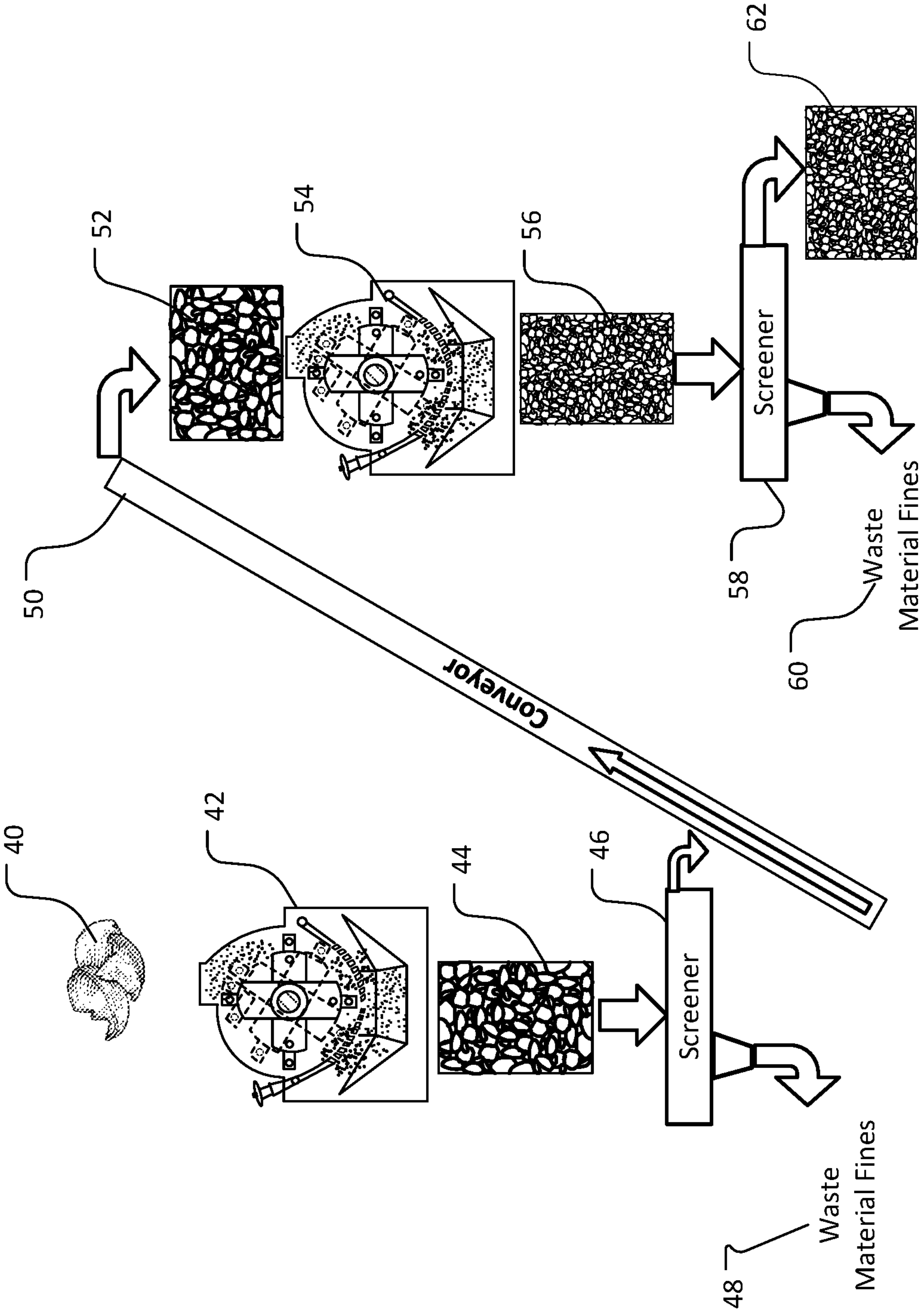
FIG. 3 shows an embodiment of a method of producing coconut crumb infill.

FIG. 3 shows an embodiment of a process for converting the hard inner shell of coconuts to coconut crumb. This process begins with the hard inner shell "skin" of the coconut 40. Typically, a coconut shell crusher opens the shells. The process then removes and discards the meat and the water. The shells then typically undergo cleaning and sanitization and dried to under 10% water content, not shown here.

The process starts with the coconut shells being run through some sort of shredding or break down machine at 42, such as a hammer mill and/or a shredder to produce coconut chips and waste material, referred to as 'fines' 44. This process typically reduces the coconut shells to chip sizes in the 20-40 millimeter range. The resulting material is then screened at 46 in which the material that is not of the right size, fines, 48, is either designated as waste material, but may be used in other processes. Some of it may be returned to the beginning of the process at 40 for reprocessing.

A conveyor 50 then moves the coconut chips 52 to a second break down process at 54. One should note that the embodiment shown in FIG. 3 shows a hammer mill, but any machine that can break down the hard coconut shell into the desired sizes, referred to here as a 'break down' machine, would work in this process. The resulting material 56 from the second breakdown process will typically comprise a mix of coconut crumb and fines. This material then undergoes screening at 58, with the waste materials or fines being recycled or used for other processes. The resulting coconut crumb can then become turf field infill.

Figure 4:
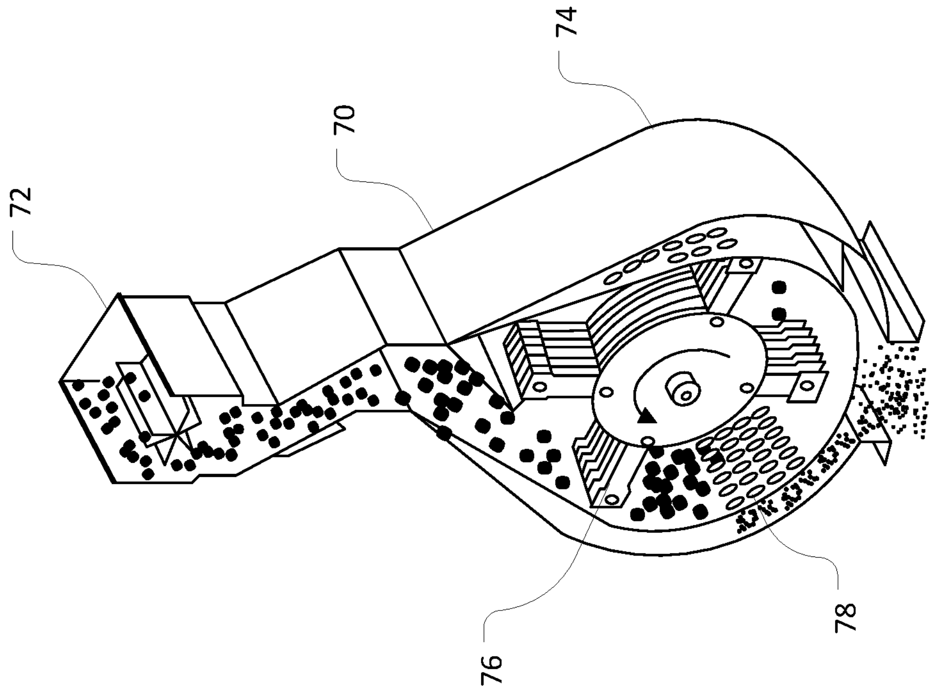
FIGS. 4-6 show examples of a hammer mill.
Figure 5:
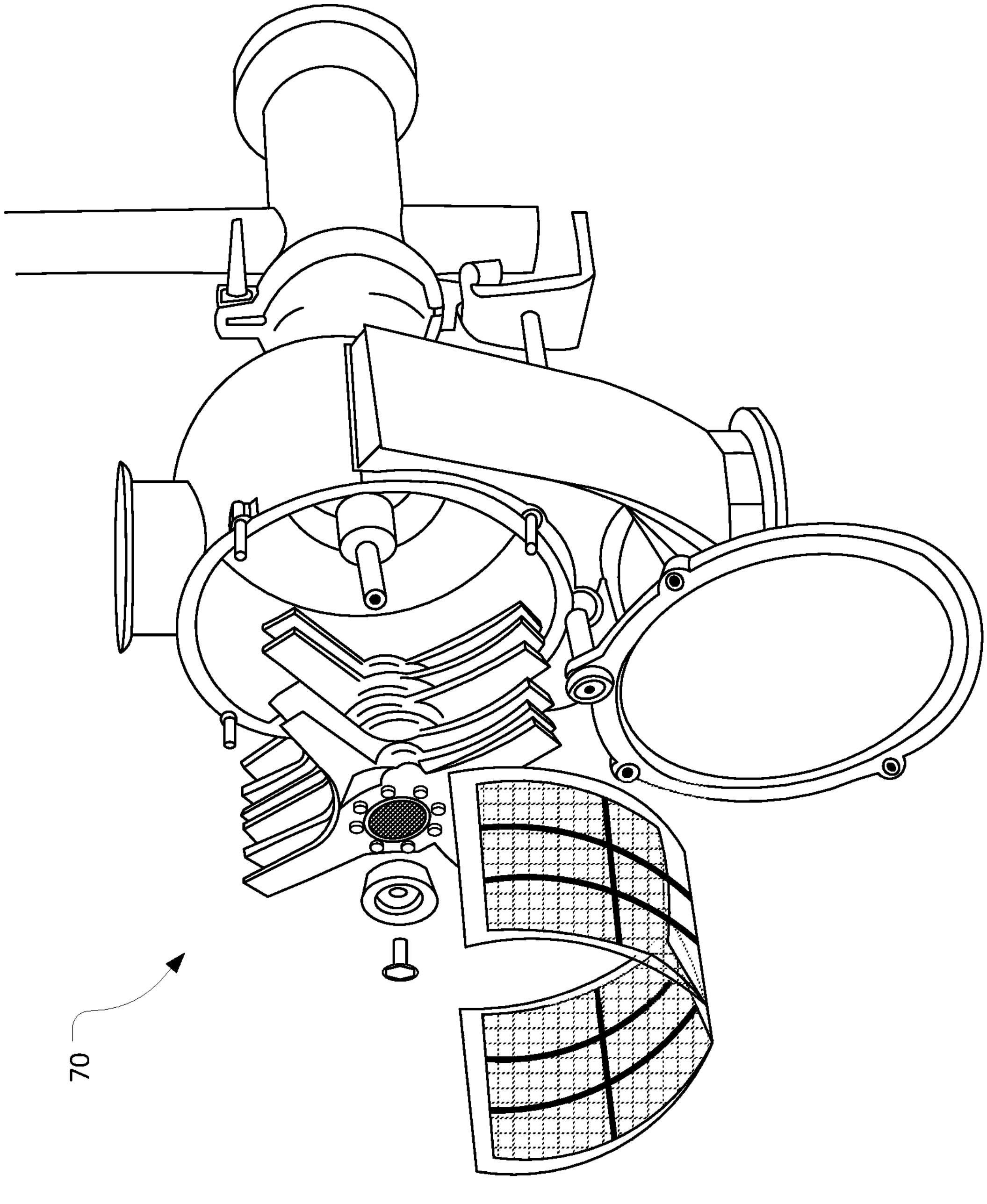
Figure 6:
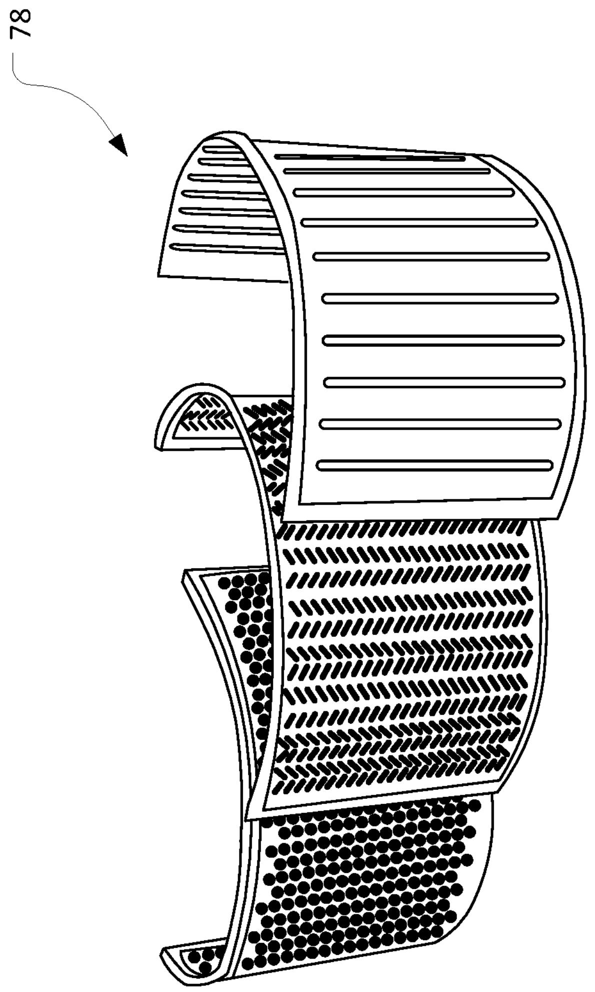

FIG. 4 shows a diagram of a hammer mill 70. The mill typically has a chute or other opening 72 to allow delivery of the coconut shells to the inner workings of the mill. The hammers 78 rotate around a rotor with hanging metal knife blades that drives them to break up the coconut shells into the chips and round off the jagged edges. A screen traps such as 78 the chips to undergo further processing and the waste material, also referred to as 'fines' are taken away. Note that this screening may comprises the screening process mentioned above, or may be prior to the screening. FIG. 5 shows a photograph of a hammer mill 70, and FIG. 6 shows embodiments of the different screens 78.

Some embodiments of the process may rely only upon a single hammer mill as the breakdown machine, with the hammers changed between the breaking down of the shells into coconut chips and coconut crumb. The user can also adjust the rotor speed to be coordinated with the screen type to ensure the output meets a size specification. For shredders, it may involve changing the size of the blades. Some embodiments may use two of one type of a break down machine such as two hammer mills or two shredders. Some of the embodiments may rely upon a combination of different types of break down machines, using one type to produce coconut chips and another type to turn the chips into crumb.

Returning to FIG. 3, the material trapped by the screen is then removed from the hammer mill and conveyed to another hammer mill. As mentioned above, one should note that the second break down machine may comprise the same break down machine after the machine is recalibrated. In this embodiment, using blunt hammers within a hammer mill, the screens and/or the hammers are changed to reduce the chips to a smaller size, plus round or blunt the sharp edges of the crumbs. The chips, meaning portions of the outer shell having sizes in the range of 20-40 millimeters, undergo further processing to reduce their sizes to 'crumbs,' meaning that they have a size in the range of 4-7 mm. The further processing also serves to smooth out the edges and remove sharp corners from the crumbs.

Other methods of reducing or breaking down the coconut outer shells to the hard granular crumbs are of course possible. For example, instead of using a hammer mill, one could employ a shredder as shown in FIGS. 7 and 8.

Figure 7:
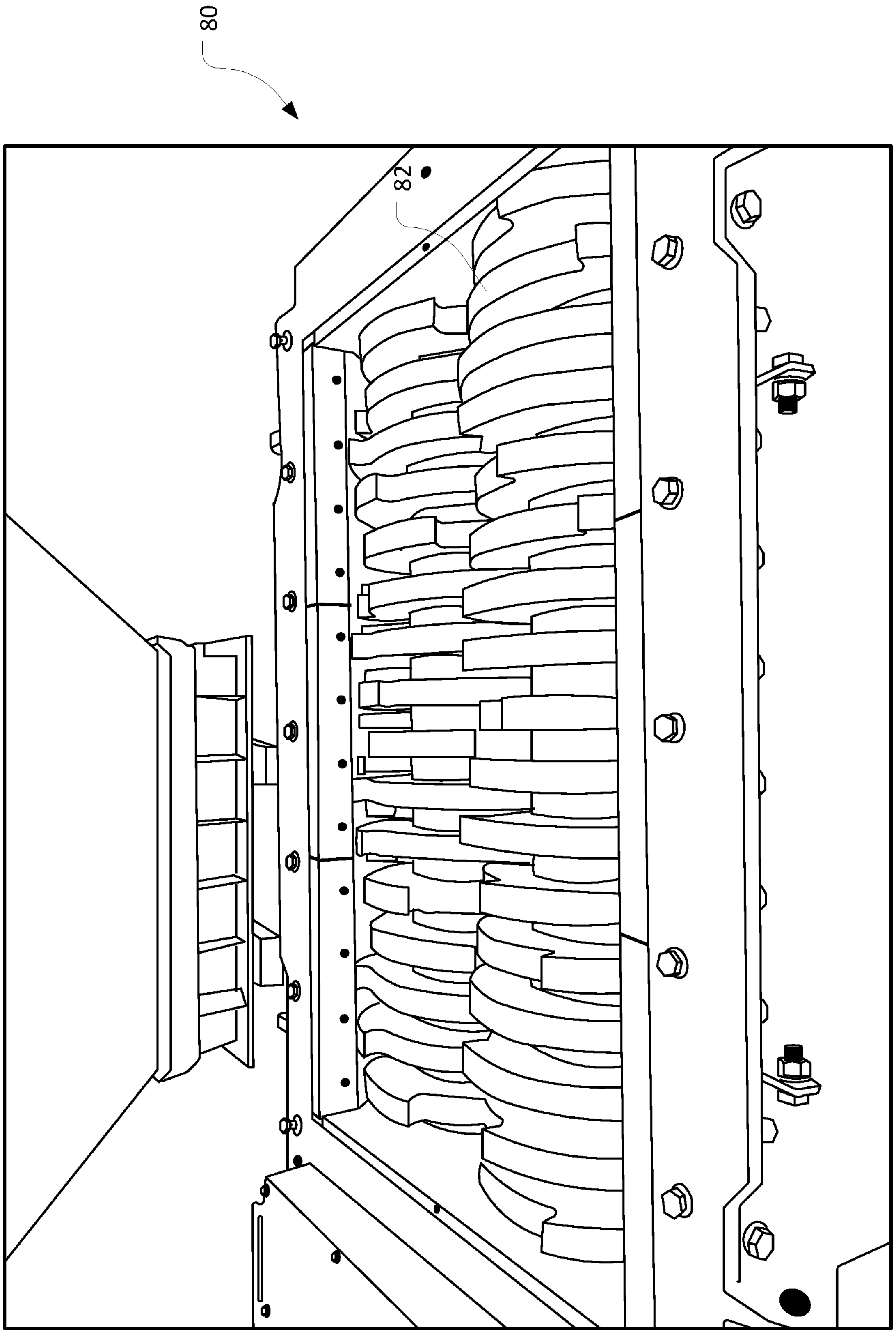
FIG. 7-8 show examples of a shredding machine.
Figure 8:
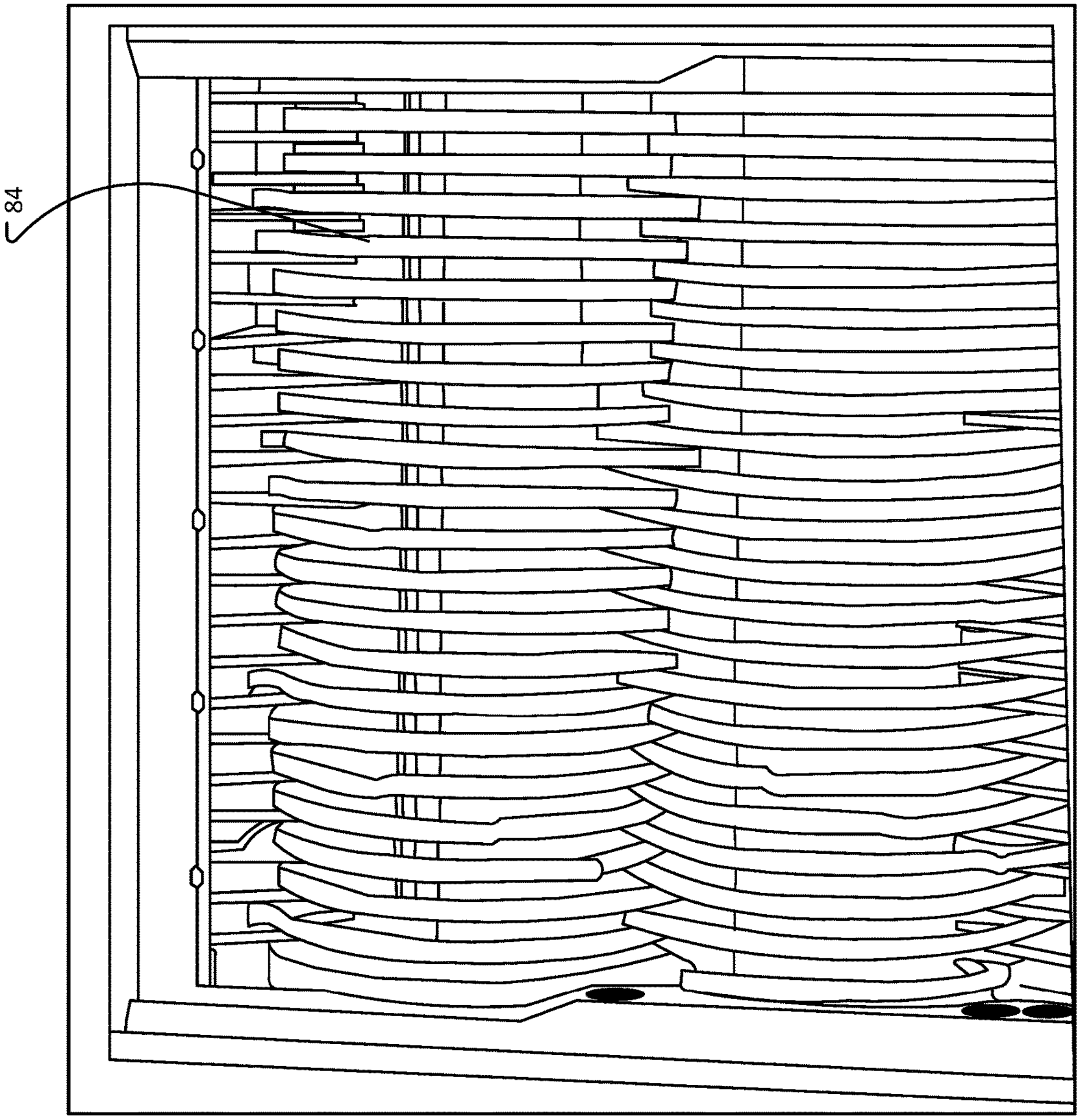

FIG. 7 shows an example of a shredder machine 80 with its outer layer of blades or teeth such as 82. These can grind up the coconut husks to a first chip size. The user selects the blade size to achieve the desired chip size. Inner teeth or blades such as 84 shown in FIG. 8 can then grind the chips into the crumb size. The shredder 80 may incorporate a screen located at the bottom to perform the screening, or may just have an outlet that produces the coconut crumb to undergo a separate screening process.

Any method that reduces the size of the coconut husks to the crumb size without leaving any sharp corners or loose material behind will suffice to convert the coconut husks into coconut crumbs. These are then useful as infill in the synthetic turf as shown in FIG. 2.

Figure 9:
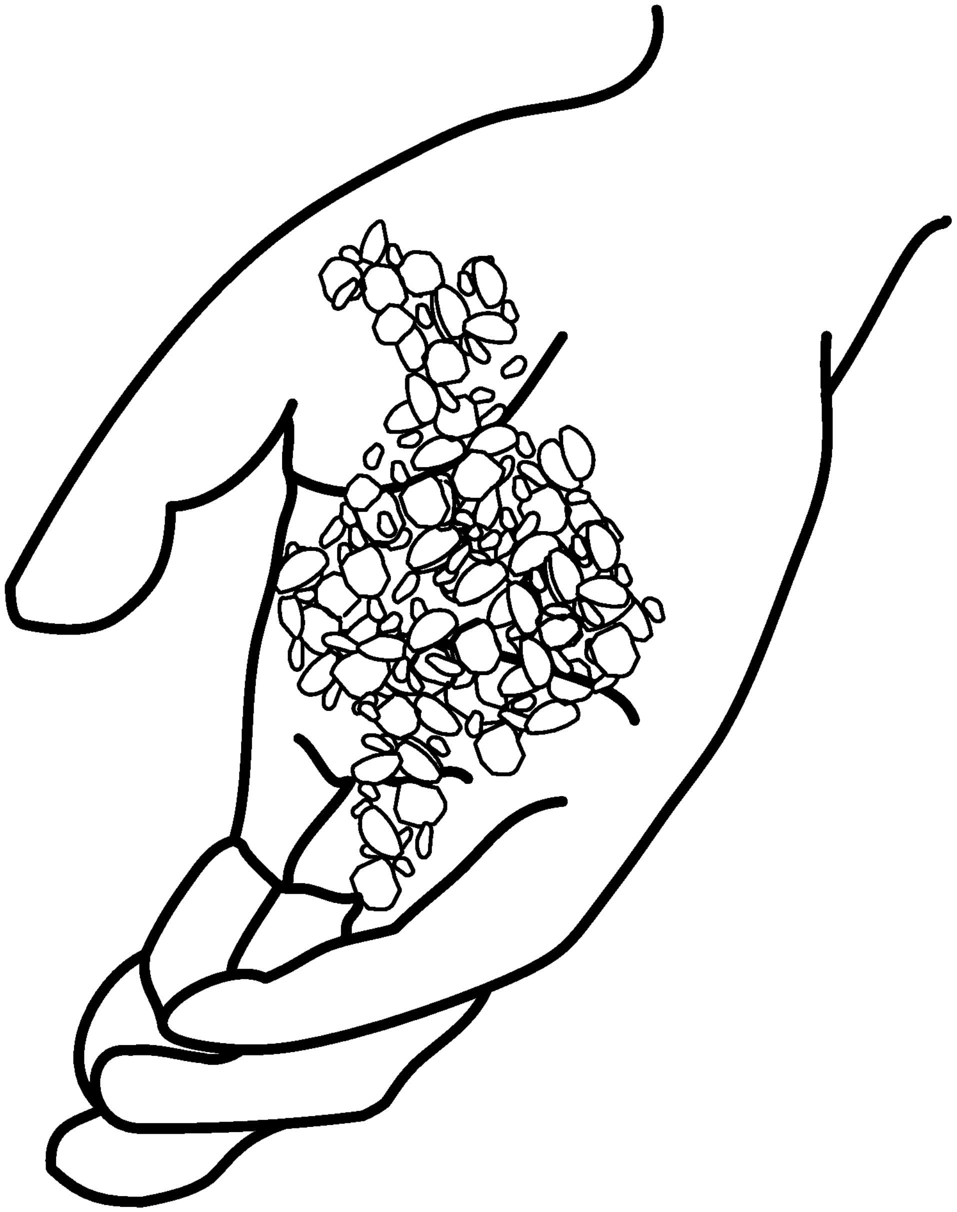
FIG. 9 shows a view of the coconut crumb infill.

FIG. 9 shows an embodiment of the resulting crumbs. FIG. 9 shows a hand to provide a sense of scale of the resulting crumbs. As mentioned above, the crumbs typically has a size in the 4-7 mm range, but any particle at 10 mm or below falls under the label of 'crumb.'

In this manner, one can use an environmentally friendly, where otherwise waste product of coconut shells replaces the non-biodegradable tire crumbs currently in use on synthetic turf fields. The hard shells of the coconuts do not absorb water in a significant amount when wet, has antifungal characteristics, and while they will over time degrade, it is much less expensive and cost effective to replace them. The material is organic, sustainable, renewable, and safe for people and pets.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the below claims.

What is claimed is:

1. A method of producing coconut crumb, comprising:

performing a first break down process on hard shells of coconuts to produce a first material comprising coconut chips in a size range of 20 to 40 millimeters and waste fines of an incorrect size;

screening the first material to separate the coconut chips from the waste fines of the incorrect size;

performing a second break down process on the coconut chips to produce a second material comprising coconut crumbs in a size range of 4 to 7 millimeters and waste fines of an incorrect size; and screening the second material to separate the coconut crumbs from the waste fines of the incorrect size.

2. The method as claimed in claim 1, wherein performing the first break down process and performing the second break down process is performed by a same type of machine.

3. The method as claimed in claim 1, wherein performing the first break down process and performing the second break down process is performed by a two different types of machines.

4. The method as claimed in claim 1, wherein performing the first break down process and performing the second break down process is performed by a same machine that has been recalibrated between the first performing and the second performing.

5. The method as claimed in claim 1 wherein screening the first material occurs as one of either part of the performing of the first break down process or a separate screening.

6. The method as claimed in claim 1, wherein screening the second material occurs as one of either part of the performing of the second break down process or a separate screening.

7. The method as claimed in claim 1, wherein at least one of the performing of the first break down process and the performing of the second break down process is performed by a hammer mill.

8. The method as claimed in claim 1, wherein at least one of the performing of the first break down process and the performing of the second break down process is performed by a shredding machine.

9. The method as claimed in claim 1, further comprising sanitizing the outer shells of the coconuts and bringing the outer shells of the coconuts to no more than 10% water content prior to the performing of the first break down process.

* * * * *